July 29, 1952  E. WAGNER  2,605,168
PROCESS FOR THE PREPARATION OF CHLORINE DIOXIDE
Filed June 6, 1949
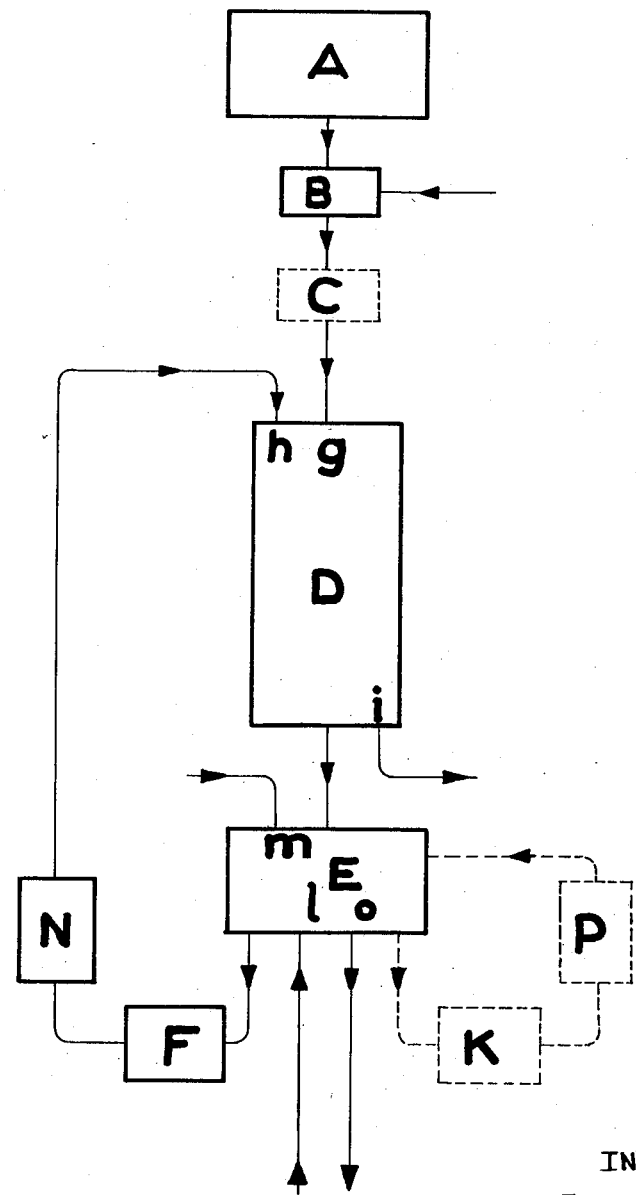
INVENTOR
ERNST WAGNER
By Bailey, Stephens & Huettig
ATTORNEYS Patented July 29, 1952

2,605,168

UNITED STATES PATENT OFFICE 2,605,168

PROCESS FOR THE PREPARATION OF CHLORINE DIOXIDE

Ernst Wagner, Konstanz, Germany, assignor to Deutsche Gold-Und Silber-Scheideanstalt vormals Roessler, Frankfort-on-the-Main, Germany, a corporation of Germany Application June 6, 1949, Serial No. 97,479
In France June 10, 1948

5 Claims. (Cl. 23—152)

The present invention relates to an improved process for the production of chlorine dioxide and more particularly to an improved process for the production of chlorine dioxide from acidified chlorate solutions containing a reducing agent.

It is an object of the invention to provide a continuous process for the production of chlorine dioxide from acidified chlorate solutions in which the conversion of the chlorate in such solutions is substantially complete.

It is a further object of the invention to provide a continuous process for increasing the yields of chlorine dioxide from acidified chlorate solutions.

The production of chlorine dioxide from acidified chlorate solutions in the presence of a reducing agent is already known and can be carried out, for example, with a reaction in accordance with the following equation:

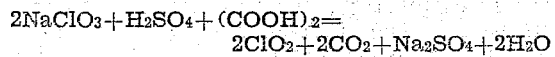
$$2NaClO_3 + H_2SO_4 + (COOH)_2 = 2ClO_2 + 2CO_2 + Na_2SO_4 + 2H_2O$$

When such reaction is carried out in large scale operations many difficulties are encountered for various reasons. Above all chlorine dioxide is very unstable and tends to decompose spontaneously. Even though the reduction of chloric acid to chlorine dioxide is itself endothermic, the total reaction involved is exothermic especially in view of the heat evolved during the oxidation of the reducing agent to carbon dioxide and water. Consequently during the production of the chlorine dioxide, depending upon the temperature and the quantity and concentration of the acid employed, such chlorine dioxide often spontaneously decomposes to chlorine and oxygen. The heat which is liberated by this decomposition leads to the danger of the decomposition of further quantities of chlorine dioxide and sometimes causes failure of the reaction. These difficulties must be taken into account especially in continuous processes which are advantageous in large scale operations. In order that the chlorate be substantially used up in a continuous process, large excesses of sulfuric acid must be employed. This, however, causes increased danger of decomposition of the chlorine dioxide. In any event when strongly acidified solutions are employed then temperature and composition must be very carefully controlled.

It has now been found that the above-mentioned difficulties may be overcome to a great extent, if the required amount of acid preferably in concentrated form is mixed with the effluent solution coming from the bottom of a reaction column and adding such mixture after heating to the head of the column so that it immediately mixes with and dilutes the freshly added solution containing the chlorate and reducing agent which are also added at the head of the column.

It has been found that this measure not only permits better temperature regulation and better regulation of the reactants added but that it also surprisingly improves the consumption of the chlorate despite the fact that the starting materials are immediately diluted upon admixture. It has been found that in this manner the chlorate can be completely decomposed in one passage through the apparatus especially when a multiple of its quantity of the fresh liquid supplied to the apparatus is constantly recycled. It is not even necessary that reaction column be especially large in order to increase the time the reaction liquid remains in the apparatus. For example, it is possible in a half sized technical apparatus with a diameter of 25 mm. and a length of 600 mm. to produce 37 g. of chlorine dioxide per hour with complete use of the chlorate employed. With the more complete use of the chlorate the yields of chlorine dioxide are also improved. In accordance with this process it is easily possible to obtain 80% to 83% yields of chlorine dioxide calculated upon the chlorate used.

The process in accordance with the invention also possesses the following advantages:

It is not only possible to maintain the reaction temperature more constant but it is also possible to heat the reaction apparatus much better and more evenly with the heated recycled liquid than was possible with jacket heating. Furthermore, with the use of sulfuric acid the heat of dilution may be utilized. As relatively concentrated solutions of the starting materials are employed the heat required for evaporation is substantially less. Also as the reactants are only mixed within the reaction column chlorine dioxide losses are avoided. Furthermore, the present process permits the use of considerably higher temperatures than are possible without recycling the liquid whereby much higher reaction speeds are obtained.

For example, when the recycle is not employed but using the same quantities of reaction components spontaneous decomposition of the chlorine dioxide begins to show up again and again after a short time of operation at 80° C., especially near the point at which the starting materials are fed to the column and even after cooling the column to 70° C. normal generation of chlorine dioxide does not occur. In such a case it is necessary to interrupt the reaction and cool off the reaction column by rinsing it out with cold water and then to start the reaction anew.

On the opposite hand, with recycling in accordance with the invention the temperature may be raised to about 95° C. without the occurrence of spontaneous decomposition of the chloric dioxide. The reason for this completely surprising phenomenon is not completely clear, but it may be caused by the presence of the materials in the recycled liquid, for example, the neutral salts. In any event it is possible in accordance with the invention to increase the conversion of the chlorate considerably because of the high temperatures which may be employed and thereby to increase the efficiency of the apparatus employed. Consequently it is possible to employ a smaller apparatus to provide a given yield. Furthermore the proportion of chlorine in the end product is not increased through the use of the higher temperatures and the selective reduction of $Cl^V$ to $Cl^{IV}$ does not suffer as was to be expected because of the less favorable reaction conditions employed.

The analysis of the gas generated by absorption in an alkaline hydrogen peroxide solution shows the contrary. While of the total chlorine containing substances obtained in the gases produced in the previously employed processes 25% and more always appeared as the chloride, this portion can be reduced to 15% and less in accordance with the invention.

Further the process in accordance with the invention may be carried out with much better utilization of the acid employed. In the previous processes the quantity of acid used was always in excess and in some instances a multiple of the theoretical quantity necessary. In the process according to the invention it is necessary to add continuously only the quantity actually used to bind the alkali even though the process is carried out with a relatively high acid concentration of, for example, 500 g. of sulfuric acid per liter. In accordance with the invention it is only necessary continually to remove the excess of water and the neutral salts which are formed and this, for example, can easily be accomplished by a suitable combination of evaporation and crystallization.

Practically all chlorates may be employed in accordance with the invention but in some instances they are not all equally advantageous. For example, when chlorates such as barium or calcium chlorates are employed with sulfuric acid it is necessary to provide the reaction column with such surface enlarging means which are not easily clogged with the precipitates formed. The liberation of the chloric acid from the chlorates may be accomplished with practically all acids which are stronger than chloric acid, both inorganic and organic acids such as oxalic acid are suitable as long as they do not have an oxidizing action similar to nitric acid. Hydrochloric acid is sometimes preferred especially in those instances wherein an increased chlorine content in the chlorine dioxide is desirable as is many times the case when it is used for bleaching cellulose. For general technical use sulfuric acid has been found most suitable.

The process according to the invention may, for example, be carried out by preparing a saturated solution of a chlorate such as an alkaline earth metal chlorate or preferably sodium chlorate and a reducing agent such as, for example cellulose pitch in sufficient quantity to effect the desired reduction and supplying this solution continuously together with an inert gas, under foaming conditions if desired, to the top of a reaction column provided with surface area enlarging elements. Liquid is withdrawn from the lower end and recycled to the top of the column after addition of a sufficient quantity of acid for the reaction and after heating to such a temperature that the quantity recycled together with the heat produced during the reaction will maintain the desired reaction temperature within the column and compensates for the cooling effects of the cold starting materials which are supplied as well as the water evaporation caused by the inert gas stream which is carried along with the reaction liquid. The quantity of recycled liquid depends to a considerable extent upon the size and nature of the reaction column and can, for example amount to thirty to fifty times the quantity of the cold chlorate containing solution which is supplied to the column. The quantity of the recycled liquid may also be reduced if the column is also heated by the other means, for example, by jacket heating. The quantity of acid consumed during the reaction is continuously replaced by addition to the recycle liquid so that the desired acid concentration for the reaction is maintained substantially constant. The liquid flowing from the bottom of the column, which is substantially free of chloric acid, is allowed to collect in an accumulating vessel which is preferably sufficiently large to contain a quantity of liquid to start operation of the apparatus and to compensate for fluctuations caused by the recycle pump. An inert gas, such as air may be blown through this vessel to drive out chlorine dioxide which is dissolved in the liquid therein. The liquid is recycled to the head of the column after replacement of the acid consumed during the reaction and after heating if necessary. The effluent from the accumulating vessel may be treated to remove the salts produced by the chlorate and acid by suitable means for example, a tube crystallizer and may then after suitable heating and concentration be returned to the vessel. This procedure renders it possible continuously to feed only the quantity of acid which is actually consumed in binding the cation of the chlorate during the process.

To improve the exsorption of the chlorine dioxide from the reaction liquid it has been found advantageous to add agents to the reaction liquid which act as foaming agents under the conditions of the reaction, such as, for example, the sulfonation products of fatty alcohols, fatty acids, and the like which are commonly employed as wetting agents in the textile industry. A foaming agent which is also a reducing agent may be used advantageously. Cellulose pitch (a pitchy product resulting from the evaporation of waste sulfite liquor) and vinasse are examples of foaming agents which are also reducing agents.

The gas mixture produced in the reaction is removed from the lower end of the column and can, depending upon the end product desired, be subjected to the necessary further treatment.

The accompanying drawing diagrammatically shows an apparatus adapted for carrying out the process in accordance with the invention.

The following examples with reference to the drawings will serve to illustrate the process according to the invention.

Example I

A solution which contains 500 g. of commercial sodium chlorate, 125 g. of cellulose pitch (calculated as dry substance) and 665 ccm. of water is withdrawn from a storage vessel A and is introduced through a metering device B at a rate of 370 ccm. per hour together with 120 liters of air per hour into the filled reaction column D at $g$. The reaction column has a diameter of 35 mm. and a height of 2000 mm. The spent reaction liquid which flows out of the lower end of the reaction column at about 90° C. to 92° C. is introduced into an accumulating vessel E, and 85 liters of air per hour are blown through it. Sulfuric acid in a quantity of 350 g. per hour are introduced into vessel E at $m$. The liquid is then recycled through pump N and through heater F to raise its temperature to about 95° C. and is reintroduced at the head of the reaction column at $h$. The effluent leaving the vessel E at $o$ amounts to about 450 ccm. per hour and is free of chloric acid indicating a 100% conversion.

The gas mixture produced during the reaction is withdrawn from the lower end of the column at $i$ and is freed of water vapor by cooling. Absorption in alkaline hydrogen peroxide indicated a yield of 83% of sodium chlorite calculated upon the chlorate put in.

Example II

A solution containing 500 g. sodium chlorate, 665 ccm. of water and 100 g. of cellulose pitch is treated in a manner similar to that described in Example I but is converted into a foam in a foam forming device C with 120 liters of air per hour before introduction into the reaction column D. The quantity of sulfuric acid added at $m$ amounted to 110 g. per hour.

Instead of withdrawing the effluent from the vessel E at $o$ as in Example I a portion of the sulfuric acid salts in the liquid in vessel E are removed by passing a portion of such liquid through a tube crystallizer K wherein 165 g. of such salts are removed per hour and heating and concentrating the desalted liquid in evaporator P and returning the desalted and concentrated liquid to E. In this way the water and salts accumulating during the reaction are removed while the acid still remaining in the liquid drawn off from the bottom of the reaction column is recycled without loss. The conversion of the chlorate amounted to 100% and the yield of chlorine dioxide was 80%.

The process in accordance with the invention may be combined with the procedures described in copending applications entitled Process for the Preparation of Chlorine Dioxide, Serial Numbers 97,477 and 97,478, filed June 6, 1949. Also the chlorine dioxide obtained in accordance with the invention may be converted into solid chlorite in accordance with the process described in copending application entitled Process for the Preparation of Solid Chlorite, Serial Number 97,476, filed June 6, 1949.

I claim:

1. In a process for the continuous production of chlorine dioxide from an aqueous solution of an acid and a chlorate salt in the presence of a reducing agent and an inert gas, the steps which comprise continuously introducing fresh reaction solution containing a chlorate salt and a reducing agent together with an inert gas at the top of a reaction space, removing spent solution from said reaction space, removing chlorine dioxide from said reaction space, removing a portion of the water and of the neutral salts contained in the spent reaction solution, introducing fresh acid in the spent reaction solution, continuously recycling the spent reaction solution to the reaction space at the point where the fresh reaction solution is introduced into the reaction space, the quantity of spent reaction solution recycled to the reaction space being 30 to 50 times the quantity of the fresh reaction solution being introduced into the reaction space and maintaining a reaction temperature between 80° C. and 95° C. within the reaction space.

2. A process in accordance with claim 1, in which the water removed from the spent reaction solution is removed by evaporation and the neutral salts removed from the spent reaction solution are removed by crystallization.

3. A process in accordance with claim 1, in which the fresh reaction solution is introduced into the reaction space in the form of a foam.

4. A process in accordance with claim 1, in which the reducing agent employed is a foaming agent.

5. A process in accordance with claim 1, in which the reducing agent employed is a waste sulfite liquor product.

ERNST WAGNER.

REFERENCES CITED

The following references are of record in the file of this patent:

UNITED STATES PATENTS

| Number | Name | Date |
|---|---|---|
| 2,332,181 | Soule | Oct. 19, 1943 |
| 2,335,808 | Soule | Nov. 30, 1943 |
| 2,357,121 | Lovell | Aug. 29, 1944 |
| 2,373,645 | Bender | Apr. 17, 1945 |
| 2,409,862 | Hutchinson | Oct. 22, 1946 |
| 2,489,572 | Hampel | Nov. 29, 1949 |

FOREIGN PATENTS

| Number | Country | Date |
|---|---|---|
| 575,173 | Great Britain | Feb. 6, 1946 |
| 577,054 | Great Britain | May 2, 1946 |